June 8, 1965  J. T. BEESTON, JR  3,187,576
ELECTRONIC THERMOMETER
Filed May 18, 1960  3 Sheets-Sheet 1

INVENTOR.
JOHN T. BEESTON, JR.
BY Morton I. Adler
ATTORNEY.

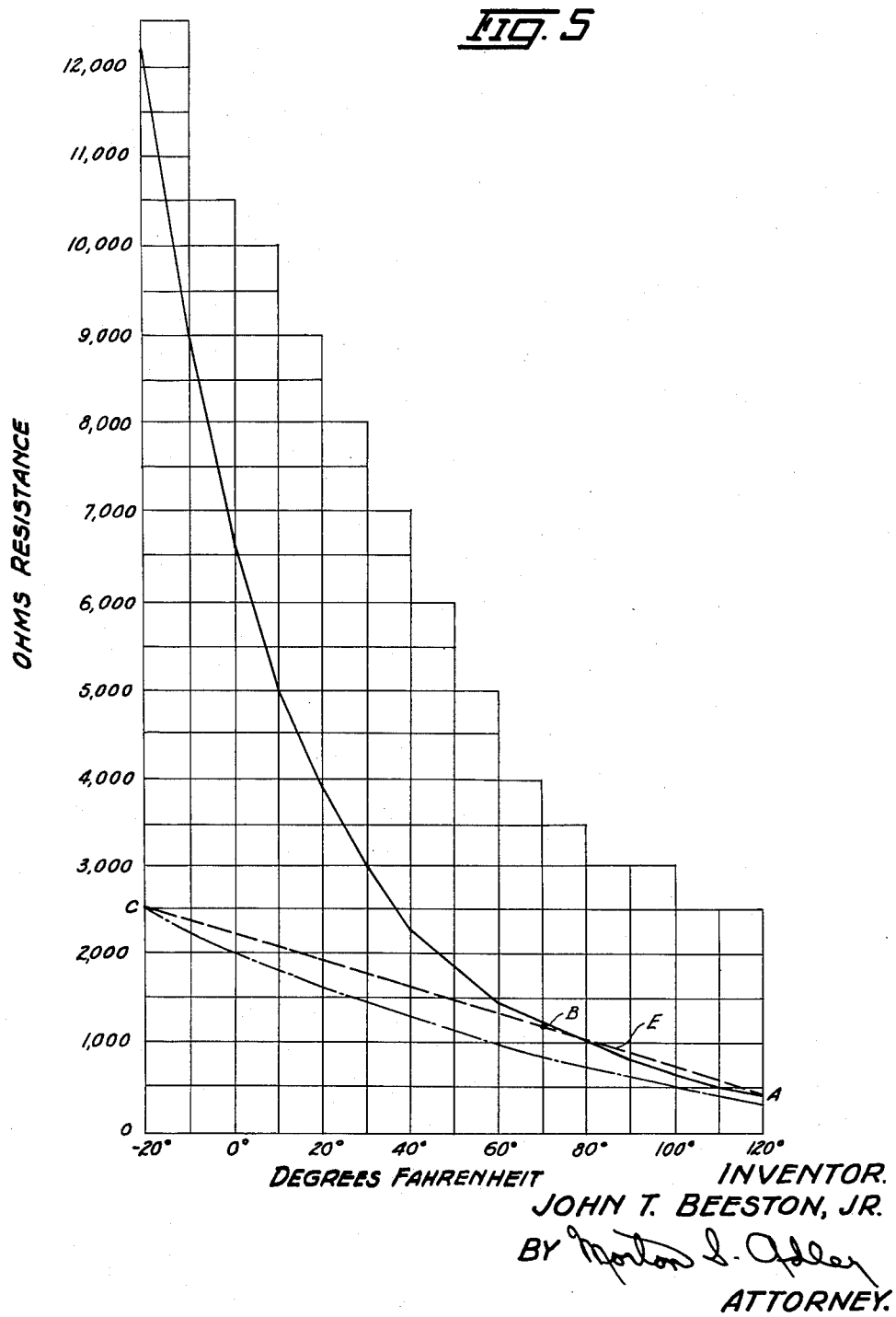

June 8, 1965  J. T. BEESTON, JR  3,187,576
ELECTRONIC THERMOMETER
Filed May 18, 1960  3 Sheets-Sheet 3
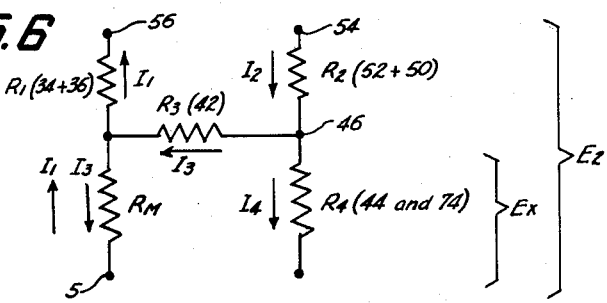
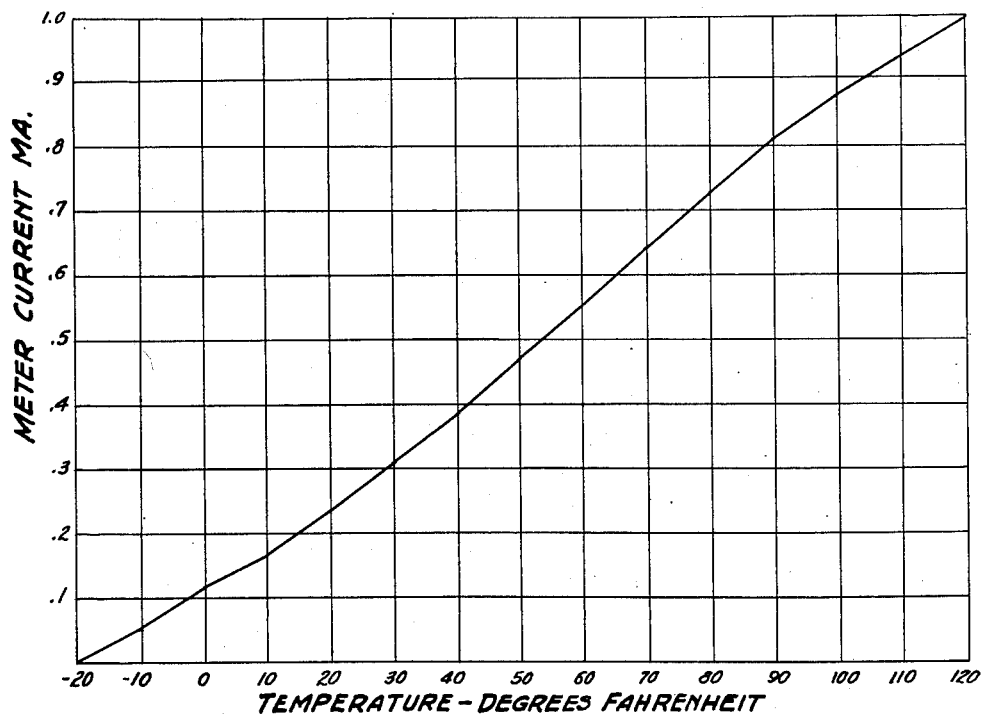
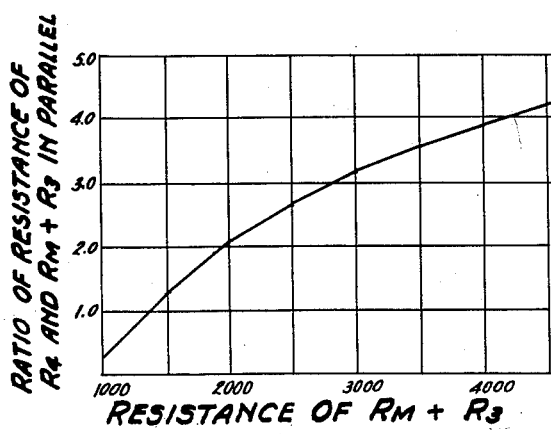
INVENTOR.
JOHN T. BEESTON, JR.
BY
ATTORNEY.

United States Patent Office 3,187,576
Patented June 8, 1965

3,187,576
ELECTRONIC THERMOMETER
John T. Beeston, Jr., Des Moines, Iowa, assignor to Frontier Development, Inc., Des Moines, Iowa, a corporation of Iowa
Filed May 18, 1960, Ser. No. 29,895
14 Claims. (Cl. 73—362)

This application is a continuation-in-part of my copending application Ser. No. 789,887, now Patent 3,036,464.

This invention relates to electronic thermometer systems, and particularly to electronic thermometer systems of the type incorporating temperature sensitive resistance devices and circuit means controlled thereby for operating an indicating instrument.

Various types of electronic temperature measuring systems have been heretofore suggested. While some satisfactory arrangements have been developed, such as that described in my copending application Ser. No. 789,887, I have found that the accuracy of the prior systems is somewhat limited.

Accordingly, a primary object of the present invention is to provide an electronic thermometer system adapted to supply opposing currents to an indicating instrument whereby the difference between the currents results in establishing an indication of the temperature being measured. More particularly, an object of the present invention is to provide an electronic thermometer system wherein opposed currents are developed from separate regulated current sources so coupled together that any deviation of the regulated values of the sources does not affect the accuracy of the system.

Yet another, and still further object of the present invention is to provide an electronic temperature measuring system incorporating a plurality of temperature sensitive resistance devices whereby temperatures at several remote locations can be measured by a single centrally located indicating instrument.

Still a further object of the present invention is to provide an electronic thermometer system conforming with the preceding objects, incorporating a meter means having a linearly calibrated temperature indicating scale and operating through circuit means including temperature sensitive resistance devices having non-linear characteristics.

In addition to the foregoing objects of the present invention, a specific object of the present invention is to provide an electronic thermometer system having circuitry which can be housed within a relatively small ventilated housing, and also having a temperature sensitive device selectively switchable within the system, and carried within the housing.

Because of the fact that circuit means contained within a housing inherently cause the temperature within the housing to rise, the inclusion of a temperature-sensitive device within the housing in and of itself may not result in the production of accurate readings of the temperatures adjacent the housing. Accordingly, an even more specific object of the present invention is to provide a ventilated housing provided with means for maintaining a temperature-sensitive device within the housing at a temperature equal to ambient temperatures outside of, but adjacent the housing.

As set forth above, the present invention is concerned with utilizing opposing currents for operating an indicating device in an electronic thermometer system, and the development of such currents from two sources of relatively opposite polarity. Thus, an additional and specific object of the present invention is to provide an improved and simplified electronic circuit for developing stabilized D.C. voltages of opposite polarity.

Yet other and still further objects of the present invention are: (a) to develop mathematical formulae setting forth the relationships between, and comparative values of, various components used in the system and various currents flowing in the circuitry thereof; (b) to provide an electronic thermometer system incorporating a plurality of non-linear temperature sensitive devices and but a single resistance coupled therewith via switching means for linearizing the operating characteristics of the temperature sensitive devices; (c) to provide an electronic thermometer system which can be assembled from existent commercially available components, and easily and inexpensively manufactured; and (d) to provide an electronic thermometer system utilizing a single thermonic valve for regulation of two voltage sources.

Basically, and in its simplest aspects, the invention provides an electronic thermometer comprising the combination of a current-responsive indicating means adapted to indicate temperatures in response to effective currents flowing therethrough, a first circuit means for causing a first current to flow through the indicating means in one direction, and a second circuit means for causing a second current to flow through the indicating means in a direction opposite to that of the current caused by the first circuit means. One of the circuit means includes temperature sensitive devices for producing variations in the magnitude of the current caused to flow through the indicating device thereby. Thus, the first and second circuit means produce an effective current equal to the difference between the currents produced by each of the circuit means, and the effective current has a magnitude variable with the temperature being measured.

The invention will be better understood, and objects other than those specifically set forth above will become apparent, when consideration is given to the following detailed description of the invention. The description refers to the illustrative embodiments of the invention presented in the annexed drawings, wherein:

FIGURE 5 is a temperature resistance curve showing exemplary operating characteristics of the temperature-sensitive devices;

FIGURE 6 is a network diagram showing the manner in which various currents flow in the circuit of FIGURE 4.

FIGURE 7 is a graph showing the relationship between certain resistance elements in the circuit of FIGURE 4.

FIGURE 8 is a graph showing the relationship between temperature change and variations in effective current through the indicating means included in the system.

Figure 1:
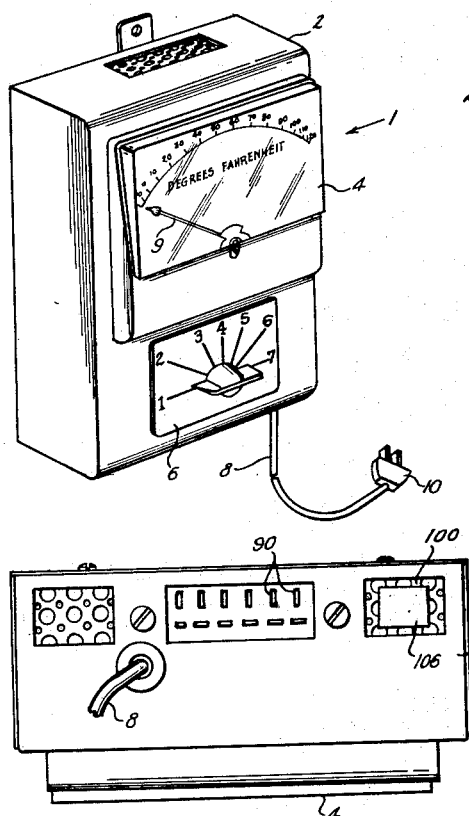
FIGURE 1 is a perspective view of my improved electronic thermometer system showing a housing in which the circuitry thereof may be contained, the indicating means which is part of the system, and the switching means operative to selectively determine the temperature at any one of a number of given locations.

If references first made to FIGURE 1, it will be noted that the numeral 1 has been used to generally designate my electronic thermometer system. Preferably, the system is constructed within a housing 2 carrying a suitable means adapted to indicate temperatures such as a meter 4. Moreover, as explained in detail hereinbelow, a switching means 6 is carried by the housing so that the indicating means 4 can be used to measure temperatures at a plurality of selectable remote locations. Power for the instrument is supplied by a cord 8 carrying on one end thereof a plug 10 adapted to cooperate with an ordinary wall outlet.

Figure 4:
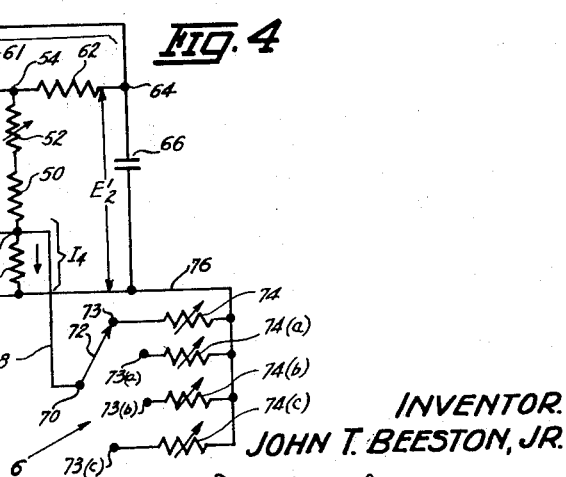
FIGURE 4 is a circuit diagram showing the overall system of my electronic thermometer.

Before considering the manner in which the various components of the system are carried within the housing 2, or coupled thereto, attention will be directed to FIGURE 4 wherein the overall circuitry is most clearly presented. In that figure, essentially two circuit means are shown as being coupled with the indicating means or meter 4. Specifically, the first circuit means includes the diode 22, the capacitor 24, and resistances 30, 34 and 36, and the second circuit means includes diode 20, capacitance 66, and resistances 62, 52, 50, 44, 42, and temperature sensitive devices 74.

As will become apparent from the following detailed description, the first circuit means operates to feed a first current to the meter 4 in one direction, and the second circuit means operates to feed a second current to the meter 4 in the opposite direction. The temperature sensitive devices 74 included in the second circuit means produce variations in the magnitude of the current fed to the meter 4 by the second circuit means. Accordingly, the current fed to the meter 4 by the first circuit means, and the current fed to the meter 4 by the second circuit means provide an effective current equal to the difference between the currents fed to the meter by each of the circuit means. This effective current has a magnitude variable with the temperatures being measured.

Although in its basic aspects, my circuitry can be described as comprising first and second circuit means, each of the circuit means, according to the invention, includes a source of stabilized D.C. voltage. The source of D.C. voltage in one of the circuit means is of opposite polarity to that in the other circuit means so that the currents produced by each of the circuit means will be caused to flow through the meter in opposite directions. The electronic circuit which I provide for developing the stabilized D.C. voltages of opposite polarity includes a single transformer 12 having a primary winding 14 and a secondary winding 16. Primary winding 14 is coupled to an ordinary wall outlet by means of a cord such as that designated by numeral 8 in FIGURE 1. The secondary winding or coil 16 has at least two terminals such as those designated by numerals 18 and 26. One of the terminals, namely terminal 26, is connected with the point of reference potential such as electrical ground, as indicated at point 40. Coupled to the other terminal of the transformer 12, or more particularly, secondary 16 thereof, is the diode 20 which is a first rectifying means and the diode 22 which is a second rectifying means 22. Each of the rectifying means is provided with a positive terminal and a negative terminal. The positive terminal 19 of rectifying means 20, and the negative terminal 25 of rectifying means 22, are coupled to the terminal 18 of the secondary 16 of transformer 12. A first capacitance 66 is coupled between the negative terminal 23 of rectifying means 20, and the point of reference potential, namely, ground 40. The second capacitance means 24 is coupled between the positive terminal 27 of rectifying means 22, and the point of reference potential, namely, ground 40. In this manner, the first capacitance 66 is chargeable by conduction of the first rectifying means 20 with a given polarity. As shown, the terminal 64 of the capacitance means 66 would be negatively charged with respect to the ground upon conduction of rectifying means 20. Capacitance means 24 is chargeable via rectifying means 22 with the opposite polarity, or, terminal 28 of capacitance means 24 is charged positive with respect to ground. Coupled between the first and second capacitive means, or more particularly, terminals 28 and 64 is a voltage regulating means 60. The voltage regulating means comprises a voltage regulating tube 61 having a plate 56 and a cathode 58. Coupled between the cathode 58 and the terminal 64 of capacitance means 66 is a resistance 62, and coupled between the plate 56 and the terminal 28 of capacitance means 24 is a resistance 30. Preferably, the resistances 30 and 62 are of equal value or magnitude so that equal potentials are maintained on either side of the voltage regulating tube 61. More particularly, since the capacitance means 24 and the capacitance means 66 are coupled with a reference potential, and coupled together, equal potentials can be maintained between terminal 28 and ground and terminal 64 and ground. In FIGURE 4 these potentials are designated by $E_1'$ and $E_2'$. When the resistances 30 and 62 have equal values, $E_1'$ and $E_2'$ are equal in magnitude but of opposite polarity. The voltages $E_1'$ and $E_2'$ are applied across suitable resistance networks which are coupled with the meter 4 for operation thereof.

A first resistance network comprising a variable resistor 34 and a fixed resistor 36 is coupled with one side of the voltage regulating tube 61, as a point 32. This is a series of network which extends between the terminal 32 and the input terminal 7 of the meter 4. Coupled with the other side of the voltage regulating tube, as at terminal 54, is a second resistance network. The second resistance network includes a series combination of variable resistor 52 and fixed resistor 50, which is coupled via resistance 42 with the input terminal 7 of the meter means. Coupled in parallel with the meter means and forming part of the second resistance network is a circuit branch or additional network including resistance 42, resistance 44 and a temperature-sensitive device 74. More particularly, the resistance 44 is coupled between terminal 46 and ground, and across such resistance the temperature-sensitive devices 74 are selectively includable within the circuit. For this purpose, a lead 78 extends between terminal 46 and terminal 70 to couple a switch contact 72 of a multi-position switching means 6 with the terminal 46. Also, a lead 76 extends between ground and one terminal of each of the tempeature-sensitive devices 74. The switch contact 72 is movable selectively between the terminals 73, 73A, 73B, and 73C, whereby any one of the temperature-sensitive devices 74, 74A, 74B or 74C may be coupled in parallel with the resistance 44. The resistance 44 is designed to linearize the non-linear characteristics of the temperature-sensitive devices in the manner set forth in detail hereinbelow.

The temperature-sensitive devices 74 preferably are thermistors having resistance characteristics which vary with temperature. Since the temperature-sensitive devices are coupled in parallel with the meter 4 and since their resistance is variable, they serve to vary the current caused to flow through the meter by the second circuit means. More particularly, a current $I_2$ flows from point 54 to point 46, and this current splits at point 46 into two component parts, namely, current $I_3$ and current $I_4$. Current $I_3$ flows from point 46 through resistance 42 and the meter to ground, while current $I_4$ flows through the parallel combination of resistance 44 and a temperature-sensitive device to ground. The resistance between point 46 and ground varies as the temperature-sensitive resistances vary, and thus the currents $I_3$ and $I_4$ vary. While the second circuit means is causing current $I_3$ to flow through the meter, the first circuit means causes a current $I_1$ to flow through the meter 4. Current $I_1$ flows between point 56 and ground through resistances 34 and 36 and through the meter 4. Notwithstanding the fact that the current $I_3$ varies with temperature change, the current $I_1$ remains of fixed magnitude. Moreover, current $I_1$ flows through the meter in the opposite direction to current $I_3$ by virtue of the different polarities of points or terminals 28 and 64. The difference between current $I_1$ and current $I_3$ provides an effective current and this effective current operates the indicating means or meter 4.

The operation of the circuit of FIGURE 4 is dependent upon the variations in resistance of the temperature-sensitive resistance devices 74. As indicated above, such devices have a non-linear characteristic as shown in the exemplary curve of FIGURE 5, which presents the resistance of any one of the devices 74 at given temperatures between $-20°$ and $+120°$. Examination of the curve presented in FIGURE 5 shows that with the exemplary temperature-sensitive device used, the slope of the curve changes very gradually between $+120°$ F. and $+70°$ F., but from $+70°$ F. to $-20°$ F., the slope increases very rapidly. Accordingly, the nonlinear characteristics of the temperature-sensitive devices is apparent. In order to linearize the curve, I provide a single fixed resistance 44 of proper value. All of the temperature-sensitive devices can be switched in parallel with the resistance 44 by moving switch arm 72.

*Example 1.*—To determine the value for such a parallel resistance a straight line E (shown broken in FIGURE 5) is drawn through points $+120°$ F. and $+70°$ F. on the temperature curve. These points are designated respectively as A and B, A being further expressed as the point where $T_A$ (temperature) equals $+120°$ F. and $R_A$ (ohms resistance) equals 422, and B as $T_B$ equals $+70°$ F., and $R_B$ equals 1160. The slope of the line connecting the points A and B is thus expressed as:

$$M = \frac{R_A - R_B}{T_A - T_B}$$

If, now, the exemplary values for $R_A$, $R_B$, $T_A$ and $T_B$ are substituted in the above equation, we find:

$$M = \frac{422 - 1160}{120 - 70} = -14.75$$

Using the value M of the slope determined above, a point C can be found where the straight line through $+120°$ F. and $+70°$ F. intersects $T_C$ at the other end of the scale which is $-20°$ F. To solve then for $R_C$, which is the effective resistance of the combination of resistance 44 and one of the temperature-sensitive devices at $-20°$ F., I use the expression:

$$R_C = -M(T_B - T_C) + R_B$$

and substituting the respective values as given above, $$R_C = -(-14.75)(80 - (-20)) + 1160 = 2488 \text{ ohms}$$

C can now be defined as the point where $T_C = -20°$ F., and $R_C = 2488$ ohms. Since the temperature-sensitive resistance device as shown on the temperature curve of FIGURE 5 has a resistance of 12,200 ohms at $-20°$ F., such resistance at that temperature must be reduced to the value determined for $R_C$, and the value of the shunt parallel resistance, $R_S$, or resistance 44 as shown in FIGURE 4. $R_S$ is calculated from the expression of the two resistances 74($R_T$) and 44($R_S$) in parallel. Since $$\frac{1}{R_C} = \frac{1}{R_T} + \frac{1}{R_S}$$

$$R_S = \frac{R_C \times R_T}{R_T - R_C}$$

$R_S$ is thus the required resistance to correct $R_T$ to $R_C$ with $R_T$ being the resistance of the temperature-sensitive device at $-20°$ F. (12,200 ohms) and $R_C$ being determined above as 2488 ohms. Thus, $$R_S = \frac{(2488)(12,200)}{12,200 - 2488}$$

$R_S = 3130$ ohms.

The temperature-sensitive device thus selected which has an exponential curve as shown in FIGURE 5, when shunted by $R_S$ having the value of 3130 ohms obtains a nearly straight temperature curve as shown. For practical purposes, however, I use 3000 ohms for $R_S$ because of its commercial availability. As should be apparent to those of ordinary skill in the art, the same procedure and the same formula shown in Example I above may be applied to the temperature curve of any selected temperature-sensitive device to determine the value of $R_S$ in accordance with the characteristics of the particular temperature sensitive device.

As explained hereinabove, the switch arm 7 is movable over the contacts 73, 73A, 73B and 73C, to selectively couple any one of the temperature sensitive devices 74 in parallel with the resistance 44 of FIGURE 4. Accordingly, by means of the present invention, a single shunt resistance is used for purposes of linearizing the temperature-sensitive devices. According to the invention, the temperature-sensitive devices all have like characteristics so that the single shunt resistance 44 will serve to linearize all resistances.

To facilitate an understanding of the manner in which the temperature-sensitive devices 74 cause a variation in the current caused to flow through the meter 4 by the second circuit means, I have presented in FIGURE 6 a fragmental detail of the circuit through which the currents I and component parts thereof flow. In such diagram, the current flowing through the meter 4 is designated by $I_3$, the resistance of the meter is designated by $R_M$, the resistance 42 is designated by $R_3$, the resistances 50 and 52 are designated by $R_2$, and the resistance of the parallel network including resistance 44 and any one of the temperature-sensitive devices 74 is designated by $R_4 = R_C$. The voltage appearing across the whole branch between points 54 and ground is designated by $E_2$, and the voltage appearing between point 46 of FIGURE 4 and ground, is designated by $E_x$.

In order to develop an equation giving the value of $I_3$ in terms of the resistances of the second circuit means, I first find the effective resistance $R_x$ of the parallel network including $R_4$, $R_3$ and $R_M$, as follows:

$$\frac{1}{R_x} = \frac{1}{R_4} + \frac{1}{R_3 + R_M}$$

$$\frac{1}{R_x} = \frac{R_3 + R_M + R_4}{R_4(R_3 + R_M)}$$

$$R_x = \frac{R_4(R_3 + R_M)}{R_3 + R_M + R_4} \quad (1)$$

Having found the effective resistance of the parallel network, I then find the voltage which appears between point 46 and ground of FIGURE 4, this voltage being designated by $E_x$.

$$E_x = E_2\left[\frac{R_x}{R_2 + R_x}\right]$$

$$E_x = \frac{E_2 R_x}{R_2 + R_x} \quad (2)$$

Then, by Ohm's law, $$I_3 = \frac{E_x}{R_3 + R_M} \quad (3)$$

Substituting $E_x$ as given in (2) in Formula 3 above, and simplifying yields $I_3$ as follows:

$$I_3 = \frac{\frac{E_2 R_x}{R_2 + R_x}}{R_3 + R_M}$$

$$I_3 = \frac{E_2 R_x}{(R_2 + R_x)(R_3 + R_M)}$$

Substituting $R_x$ as given in (1) above, $$I_3 = \frac{E_2\left[\frac{R_4(R_3+R_M)}{R_3+R_M+R_4}\right]}{\left[R_2+\left[\frac{R_4(R_3+R_M)}{R_3+R_M+R_4}\right]\right][R_3+R_M]}$$

and simplifying $$I_3 = \frac{E_2 R_4}{R_2 R_3 + R_2 R_M + R_2 R_4 + R_4 R_3 + R_4 R_M} \quad (4)$$

Now, if reference is again made to FIGURE 4, it will be noted that the current $I_1$ which flows through the meter 4 is equal to the voltage $E_1$ divided by the total resistance of resistances 34, 36 and the resistance of the meter. This value will hereinafter be designated as $R_1$ and thus:

$$I_1 = \frac{E_1}{R_1} \quad (5)$$

The current through the meter which is effective to operate the needle 9 thereof is designated by $I_M$, and $$I_M = I_1 - I_3 \quad (6)$$

$I_1$ is given by Equation 5 above, and $I_3$ is given by Equation 4 above, and thus:

$$I_M = \frac{E_1}{R_1} - \frac{E_2 R_4}{R_2 R_3 + R_2 R_M + R_2 R_4 + R_4 R_3 + R_4 R_M} \quad (7)$$

In accordance with Formula 7, $I_M$ is given in terms of the regulated voltages and resistances of the overall system.

It should be pointed out that in the present embodiment of the invention, $I_1$ is held constant during all measurements, while $I_3$ is varied in accordance with variations of $R_4$ from one limit to another. The very fact that the current $I_1$ is held constant does not, of course, mean that the current $I_1$ must be held constant in all applications of the invention. If desired, $I_1$ can vary as some function of temperature, or in fact it can vary as a function not related to temperature, if desired.

From the foregoing discussion of the invention, it should be apparent that the resistances 30 and 62 are series regulator resistances which work in conjunction with the voltage regulating tube 61, and that the resistances $R_1$=resistance 34+resistance 36, and $R_2$=resistance 52+resistance 50 function as limiting resistors maintaining their respective currents $I_1$ and $I_2$. $R_3$=resistance 42 is a matching resistor whose function causes the resultant indication means to vary from a zero reading to a full scale reading as $R_4$ varies from one limit to another. $R_4$ is a thermo-variable equivalent resistor made up of the parallel combination of resistance 44 and one of the temperature-sensitive resistances 74. $R_M$ represents the internal resistance of the indicating means or meter 4.

As set forth above, the current through the meter is equal to the difference between the current $I_1$ and $I_3$. In other words, $I_M = I_1 - I_3$. There are two conditions which must be met by this expression. First of all, when the temperature goes to its lowest value, $I_M$ must go to a minimum whereby the indicating instrument reads its minimum value. Secondly, as the temperature being measured increases to its maximum value, $I_M$ must increase to a point where it causes the meter to indicate its maximum value. In other words, the current through the meter, $I_M$, must vary so that the meter will be caused to indicate temperatures between the extremes on the scale carried thereby. To meet these conditions, the values of resistances $R_1$, $R_2$ and $R_3$ have predetermined relationships.

*Example 2.*—This is an example of one manner in which the values of $R_1$, $R_2$ and $R_3$ can be calculated, and uses the value of $R_4$ as determined in accordance with Example 1 above.

$R_4$, it will be remembered, represents a temperature-sensitive device having the characteristic curve as shown in FIGURE 5, and being paralleled by a 3,000-ohm linearizing resistor. Over a temperature range from −20° F. to +120° F., $R_4$ will vary as shown in FIGURE 5, from 2410 to 370 ohms. All values between these two limits, are, according to the preferred embodiments of the invention, represented on the full scale of the indicating instrument, i.e., such values cause the needle to move from a minimum to a maximum as there is a variation therebetween. The ratio of resistance change is $$\frac{R-20}{R+120} = \frac{2410 \text{ ohms}}{370 \text{ ohms}} = \frac{6.52}{1} \quad (8)$$

As explained above, in connection with FIGURE 6, and as set forth in Equation 3, $I_3$ flowing through resistance $R_3$ and the resistance of the meter $R_M$ is directly proportional to $E_x$ and is given by the equation $$I_3 = \frac{E_x}{R_2 + R_M}$$

$E_x$, however, is generated by current $I_2$ flowing through $R_3$ plus $R_M$ in parallel with $R_4$. Accordingly, $E_x = I_2 \times R_x$. From Equation 1 above, $$R_x = \frac{R_4(R_3+R_M)}{R_3+R_M+R_4}$$

and thus by Ohm's law $$E_x = I_2\left[\frac{R_4(R_3+R_M)}{R_3+R_M+R_4}\right] \quad (9)$$

As explained hereinabove, $R_2$ is included in the circuit for purposes of serving as a current limiting resistor. Thus, $R_2$ has a substantially larger value than $R_x$. Accordingly, while changes in $R_4$ substantially affect $R_x$ and $I_3$, they do not substantially affect $I_2$. Thus $I_2$ may be regarded as a constant in Equation 9 above. Now, since as set forth in Equation 3 above, $$I_3 = \frac{E_x}{R_3+R_M}$$

and since set forth in Equation 9 above, $$E_x = I_2\left[\frac{R_4(R_3+R_M)}{R_3+R_M+R_4}\right]$$

the equation for $I_3$ may be written as $I_3 = E_x/R_x$ $$I_3 = \left[\frac{I_2}{R_3+R_M}\right]\left[\frac{R_4(R_3+R_M)}{R_3+R_M+R_4}\right]$$

$$I_3 = (\text{constant})\left[\frac{R_4(R_3+R_M)}{R_3+R_M+R_4}\right]$$

Accordingly, it should be apparent that $I_3$ will vary in the same ratio as $$\frac{(R_3+R_M)(R_4)}{R_3+R_M+R_4}$$

The ratio of current $I_3$ at −20° F. to current $I_3$ at +120° F. can now be written as $$\frac{I_{3\ -20°}}{I_{3\ 120°}} = \frac{\frac{(R_3+R_M)(R_{4\ -20°})}{R_3+R_M+R_{4\ -20°}}}{\frac{(R_3+R_M)(R_{4\ 120°})}{R_3+R_M+R_{4\ 120°}}} \quad (10)$$

Equation 10 shows the ratio of current $I_3$ between the temperature limits −20° F. and +120° F. is determined by $R_M$, $R_3$ and $R_4$.

Simplifying (10), $$\frac{I_{3\ -20°}}{I_{3\ 120°}} = \frac{(R_{4\ -20°})(R_3+R_M+R_{4\ 120°})}{(R_{4\ 120°})(R_3+R_M+R_{4\ -20°})} \quad (11)$$

It will be remembered that $R_4$ is a thermal variable resistor whose values are determined by the kind of thermistor material used, and in this example is paralleled by a linearizing resistance of 3000 ohms; $R_M$ is the resistance of the indicating instrument which in this example is equal to 46 ohms; and $R_3$ is the matching resistor to be determined.

From (8) above, $$\frac{R_{4\ -20°}}{R_{4\ 120°}} = 6.52$$

Since $R_M = 46$ ohms and from (8) above $R_{4\ -20°} = 2410$ and $R_{4\ 120°} = 370$, then $$(R_M + R_{4\ 120°}) = 46 + 370 = 416$$

and $$(R_M + R_{4\ -20°}) 46 + 2410 = 2456$$

Rewriting (11) with the above substitutions, $$\frac{I_{3\ -20°}}{I_{3\ 120°}} = 6.52 \left[\frac{(416 + R_3)}{(2456 + R_3)}\right] \quad (12)$$

Equation 12 gives the ratio of currents $I_3$ for any fixed positive value of $R_3$ that may be chosen.

By assigning positive values to $R_3$ between 500 and 6000 ohms in increments of 500 ohms, a graph such as that presented in FIGURE 7 may be drawn which shows how the ratio of $I_3$ varies as $R_3$ varies.

There are many values of $R_3$ which can be used, however, it should be noted that if $R_3$ has a large value the variation of current $I_3$ increases and will increase the overall sensivity. As $R_3$ increases $I_2$ must also increase to maintain $E_x$ at a potential necessary to provide current $I_3$. It must be remembered that as $E_x$ increases, the current flowing through the temperature-sensitive resitsance coupled in the circuit will increase a proportional amount, and it is important to keep the current through the temperature-sensitive devices as low as practical to prevent internal heating in the thermal element.

In other words, if $R_3$ is large compared to $R_4$ then: (1) most of the current flows through $R_4$, or there is a substantial current through the temperature-sensitive devices; (2) $I_2$ must be large so that the variation in $I_3$ goes from a minimum to a maximum to operate the meter; and (3) a larger variation in $R_4$ is required to produce a unit change in $I_3$.

If $R_3$ is small compared to $R_4$ then: (1) there is less current through $R_4$ and as a result through the temperature-sensitive devices; (2) $I_2$ can be smaller; and (3) but there would be a larger minimum current $I_3$ through the meter and accordingly $I_1$ would have to be larger to balance the larger minimum current $I_3$.

Thus, preferably $R_3$ is chosen to have a value which is a compromise and within the range between the maximum and minimum values reached by $R_4$ because of temperature variations which the system is adapted to indicate.

Accordingly, in this example, I have chosen $R_3$ as equal to 2000 ohms. From FIGURE 7, it will be noted that if $R_3$ is equal to 2000 ohms, this is the equivalent of a ratio of resistance change of 3.52.

Now, if the indicating instrument has a 0–1 milliampere range, and the circuit is so adjusted that $I_M$ is equal to 0 when the lowest temperature is $-20°$ F., and is equal to 1 milliampere when the highest temperature is equal to $+120°$ F., then the milliameter may be calibrated for the full temperature scale.

If $I_3$ could be made variable between 0 and 1 milliampere, than $I_1$ could be set as equal to 1 milliampere. However, $I_3$ cannot be made $=0$, and has a minimum value of $x$. Thus $I_1$ must be greater than 1 milliampere by an amount $x$. Accordingly, $I_1$ can be stated as being equal to $1+x$.

Now from Equation 6, when the temperature is $-20°$ F. and $I_1$ equals $(1+x)$, $I_3=(1+x)$, and $I_M$ equals 0, then $$I_M = (1+x) - (1+x) \quad (13)$$

$I_3 = (1+x)$ necessarily when $I_M = 0$ since it flows through the meter in opposition to $I_1$.

Now, if Equation 6 is considered when the temperature is $+120°$ F., and $I_1 = (1+x)$; $I_3 = x$, and $I_M = 1$; then $$I_M = (1+x) - (x) = 1 \quad (14)$$

At this temperature, $I_3$ necessarily equals $(x)$, since it flows through the meter in opposition to $I_1$ and $+120°$ F. is the temperature at which the effective current through the meter $I_M$ is a maximum.

In Equations 13 and 14, as $I_M$ varies from 0 to 1 milliampere, $I_3$ varies from $(1+x)$ to $(x)$, and thus $$\frac{I_{3\ -20°}}{I_{3\ 120°}} = \frac{1+x}{x}$$

But the ratio of $I_3$ from $-20°$ F. to $+120°$ F. has been taken as 3.52 from the graph corresponding to 2000 ohms. Thus $$3.52 = \frac{(1+x)}{(x)}$$

Solving for $x$, $$x = \frac{1}{3.52} = .413 \text{ milliamperes} \quad (15)$$

From (13) and (14), $I_1 = (1+x)$

Substituting the value of $x$ from (15), $I_1 = 1 + .413 = 1.413$ milliamperes
$I_{3\ -20°\ F.} = 1 + .413 = 1.413$ milliamperes
$I_{3\ 120°\ F.} = .413$ milliamperes It will be understood that $E_1$ and $E_2$ (FIGURE 4) represent the voltages considered in FIGURE 6 and differ from $E_1'$ and $E_2'$ by the IR drops through resistances 30 and 62 respectively which can be chosen, in any well known manner, to have suitable values in accordance with the operating characteristics of tube 61.

Now, in this example, $E_1$ is taken as 72 volts, and from (15) above, $I_1 = 1.413$ milliamperes, thus $$R_1 = \frac{E_1}{I_1} = \frac{72 \text{ volts}}{.001413 \text{ ohms}} = 51,000 \text{ ohms}$$

By reference to FIGURE 6 it will be seen that $$I_4 R_4 = I_3 (R_3 + R_M)$$

$$I_4 = \frac{I_3 (R_3 + R_M)}{R_4}$$

At $-20°$ F., $I_3 = .001413$ amperes, $R_3 = 2000$ ohms, $R_M = 46$ ohms and $R_4 = 2410$ ohms $$I_{4\ -20°} = \frac{(.001413)(2000+46)}{2410}$$

$$= .00117 \text{ ampere} \quad (16)$$

FIGURE 6 reveals that $I_2 = I_3 + I_4$
And, having already determined at $-20°$ F., $I_3 = .001413$ ampere, and $I_4 = .00117$ ampere, upon substituting these in (16).

$$I_2 = .001413 + .00117 = .002583 \text{ ampere}$$

Frmo FIGURE 6, it will be seen that $$R_2 = \frac{E_2 - E_x}{I_2}$$

at $-20°$ F., $E_x = I_4 R_4 = (.00117)(2410)$ $E_x = 2.82$ volts $E_2 = E_1 = 72$ volts $$R_2 = \frac{72 - 2.82}{.002583}$$

$R_2 = 26,800$ ohms

If the values set forth and determined in this example, namely, $E_1$, $E_2$, $R_M$, $R_1$, $R_2$ and $R_3$, are substituted in the general Equation 7 for $I_M$, and the same is solved, then one obtains a graph as presented in FIGURE 8. It is apparent from a review of this graph, that $I_M$ varies substantially directly with the temperature being measured, and that the meter scale can therefore be linearly calibrated without any significant error.

Figure 2:
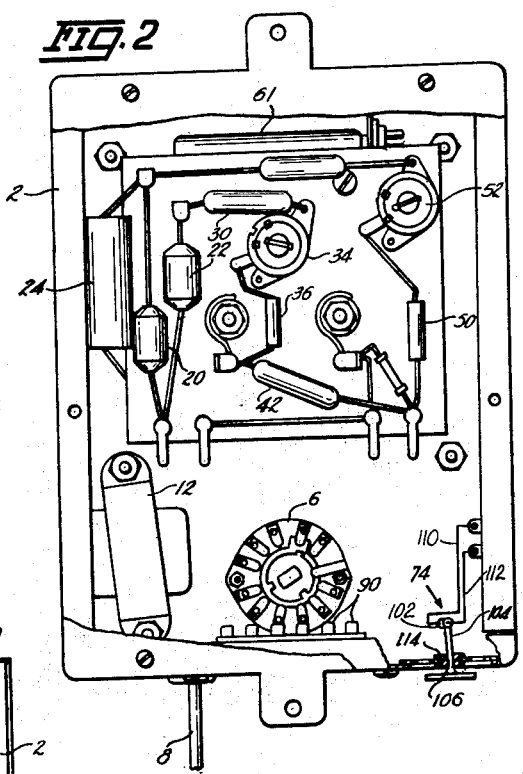
FIGURE 2 is a rear view with the cover partially broken away of the housing shown in FIGURE 1, FIGURE 2 presenting in some detail the manner in which the various components of the system are coupled together, and carried within the housing.
Figure 3:
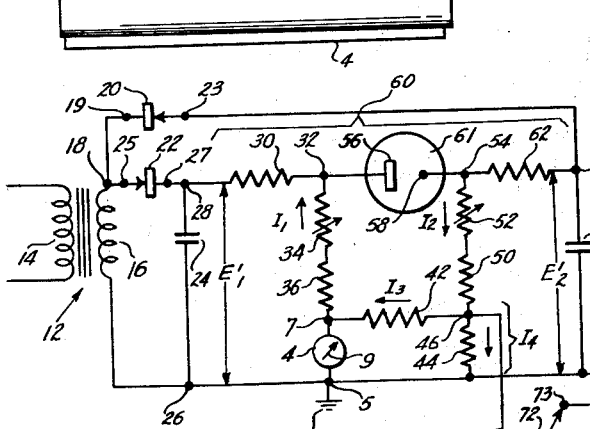
FIGURE 3 is a bottom view of the housing shown in FIGURE 2, and presents in some detail the manner in which remote temperature-sensitive devices can be coupled with the circuit portion of the system, and the manner in which a temperature-sensitive device within the housing is ventilated, and the temperature thereof is controlled.

Having set forth above in some detail the operation of the overall circuit provided by the invention, as well as the manner in which the various components thereof can be selected, attention can now be directed to the preferred manner in which such components are placed within the housing 2. In FIGURE 2, the various components shown in FIGURE 4 are presented as they actually appear, and the same numerals have been used to designate the same components. The various connections by means of terminals will be apparent from a review of the figure, and thus a detailed discussion thereof is not believed necessary. It should be pointed out, however, that (1) the plug receptacles 90 are provided so that various temperature-sensitive devices can be conveniently connected to the system, and switched therein by switching means 6, and (2) that resistances 34 and 52 (FIGURE 4) are made variable to facilitate initial adjustment and balance of the system.

One important aspect of the present invention which has not been referred to hereinabove, concerns the provision within the housing of one of the temperature-sensitive devices 74. More particularly, it is desirable in many instances to position one of the temperature-sensitive devices inside of the housing so that the ambient temperature at the housing can be determined when the switch 6 is moved to include such temperature-sensitive device within the circuit. Notwithstanding the desirability of including one of the temperature-sensitive devices within the housing, it has been found that as the circuit assumes its operating conditions, the temperature within the housing increases so that the temperature-sensitive device within the housing indicates a temperature higher than the actual ambient temperature outside of the housing. That is to say, because of the heat generated within the housing, the temperature-sensitive device is maintained at an increased temperature. It appears that the wiring coupled with the temperature-sensitive device absorbs the heat, and conducts the same to the temperature-sensitive device thereby raising its temperature above the actual temperature of air entering the housing through the ventilating area 100 above which the temperature-sensitive device within the housing is disposed.

To eliminate the problem set forth in the preceding paragraph, this invention provides a larger conductive path between the temperature-sensitive device disposed within the housing and the outside of the housing, so that any increase in temperature will be conducted outside of the housing and not affect the reading of the temperature-sensitive device within the housing. According to the invention, the temperature-sensitive device 74 within the housing is cemented as at point 102 to a copper rod 104 which, in turn, is soldered to a copper plate 106 located outside of the housing. The ratio of cross-sectional area of the temperature-sensitive device leads 110 and 112 to the cross sectional area of the heat path provided through rod 104 is of the order of 20:1. Such a ratio assures that no possible heat will accumulate in the temperature-sensitive device inside of the housing.

In order to properly insulate the copper rod 104 which extends through the housing, preferably I employ an insulating or rubber grommet 114 which surrounds the rod and insulates the rod from the housing proper.

It will be noted that the copper disc plate is placed just below the ventilating opening 100, so that air entering the housing must wipe across the copper plate and impart to it the temperature of the incoming air. By conductively coupling a temperature-sensitive device to a more efficient heat transferring device, thermal energy is prevented from accumulating in the temperature-sensitive device as it enters from electrical connecting wires. Although I have described the rod and plate as being made of copper, it should be understood that any suitable highly heat conducting material can be used for the parts of the heat transfer assembly.

From the foregoing detailed discussion of the preferred embodiments of the invention, it should be apparent that the objects set forth at the outset of this specification have been successfully achieved. Accordingly, I claim:

1. In an electronic thermometer the combination of measuring means for indicating temperatures in response to effective currents flowing therethrough, said measuring means having unidirectional indicating means adapted to indicate a scale of substantially differing temperatures, said measuring means having input and output terminals, a first source of direct current having a positive terminal and a negative terminal, said first source of direct current including transformer means, first capacitance means and first rectifying means coupled between said transformer means and said first capacitance means for charging said first capacitance means with a given polarity; a second source of direct current having a positive terminal and a negative terminal said second source of direct current including said transformer means, second capacitance means, and second rectifying means coupled between said transformer means and said second capacitance means for charging said second capacitance means with a polarity opposite said given polarity; voltage regulating means coupled between said first and second capacitance means for stabilizing the voltages thereacross; means coupling the positive terminal of one of said sources and the negative terminal of the other of said sources together and with the output terminal of said measuring means; first resistance means coupling the positive terminal of said one source with the input terminal of said measuring means whereby a first current is caused to flow through said measuring means in one direction; second resistance means coupling the negative terminal of said other source with the input terminal of said measuring means whereby a second current is caused to flow through said measuring means in a direction opposite to said one direction; and circuit means including a temperature-sensitive device for linearly varying the magnitude of the current caused to flow through said measuring means by one of said resistance means in accordance with the temperature being measured, whereby for a substantial range of temperatures a temperature linearly variable effective current is produced in said measuring means of a magnitude equal to the difference between the magnitudes of said first and second currents.

2. In an electronic thermometer, the combination defined in claim 1 wherein said circuit means for varying the magnitude of the current caused to flow through said measuring means includes a plurality of temperature-sensitive devices selectively includable within said circuit means.

3. In an electronic thermometer, the combination defined in claim 1 wherein said measuring means is linearly calibrated, wherein said temperature-sensitive device has a non-linear characteristic, and wherein said circuit means includes means for linearizing the variations in magnitude of current caused by said temperature-sensitive device.

4. An electronic thermometer comprising in combination, measuring means adapted to indicate temperatures in response to effective currents flowing therethrough, said measuring means having an input terminal and an outlet terminal, input transformer means having a secondary coil with at least two terminals, means coupling one of said terminals of said secondary coil with the outlet terminal of said indicating means, first and second rectifying means, each having a positive terminal and a negative terminal, means coupling the positive terminal of said first rectifying means, and the negative terminal of said second rectifying means with the other terminal of said secondary coil, first capacitance means coupled between the negative terminal of said first rectifying means and said outlet terminal of said indicating means, second capacitance means coupled between the positive terminal of said second rectifying means and said outlet terminal of said indicating means, voltage regulating means coupled between the negative terminal of said first rectifying means and the positive terminal of said second rectifying means, said voltage regulating means having two terminals of relatively different polarity, first resistance means coupled between one of said terminals of said voltage regulating means and said input terminal of said indicating means, second resistance means coupled with the other of said terminals of said voltage regulating means, and including a resistance network having at least one temperature-sensitive resistance device therein, said network being coupled in parallel relation with said indicating means.

5. An electronic thermometer comprising the combination defined in claim 4 wherein said resistance network includes a plurality of temperature-sensitive resistance devices, and switching means for selectively coupling said devices operatively within said network.

6. An electronic thermometer comprising meter means having at least two terminals and including a linear temperature scale and an indicating arm adapted to move across said scale to indicate temperatures in response to effective currents flowing through said meter means between said terminals thereof; an input transformer means having a secondary coil with at least two terminals, means coupling one of said terminals of said secondary coil with one terminal of said meter means, first and second diodes, each having a positive terminal and a negative terminal, means coupling the positive terminal of said first diode and the negative terminal of said second diode with the other terminal of said secondary coil, a first capacitance coupled between the negative terminal of said first diode and said one terminal of said meter means, a second capacitance coupled between the positive terminal of said second diode and said one terminal of said meter means, a voltage regulating means, said voltage regulating means comprising a voltage regulating tube means having two terminals, a first resistance means coupled between one terminal of said tube means and said negative terminal of said first diode, and a second resistance means coupled between the other terminal of said tube means and said positive terminal of said first diode; third resistance means coupled between said other terminal of said tube means and the other terminal of said meter means; a series network comprising fourth and fifth resistance means coupled between said one terminal of said tube means and said one terminal of said meter means; a sixth resistance means coupled between the junction of said fourth and fifth resistance means and said other terminal of said meter means, and a temperature-sensitive resistance device coupled in parallel with said fifth resistance means.

7. An electronic thermometer as defined in claim 6 wherein said first and second resistance means have at least substantially equal resistances; wherein said temperature-sensitive resistance device has a resistance variable between a predetermined minimum value and a predetermined maximum value, and wherein the combined resistance of said sixth resistance means and said meter means has a value within the range defined by said predetermined minimum and maximum values.

8. In combination, a housing having a ventilating area in one wall thereof, an electronic thermometer circuit including at least one temperature sensitive resistance probe adapted to be moved about exteriorly of said housing and a comparison temperature-sensitive resistance within said housing, means for conducting heat generated within said housing away from said temperature-sensitive resistance, said means including a heat conducting member extending through said ventilating area and carrying said temperature-sensitive resistance thereon.

9. In combination, a housing having a ventilating area in at least one wall thereof, an electronic thermometer circuit including at least one temperature sensitive resistance probe adapted to be moved about exteriorly of said housing and including a temperature-sensitive resistance disposed within said housing, a heat conducting rod member extending between opposite sides of said one wall and having said temperature-sensitive resistance attached thereto within said housing, grommet means for insulating said rod member from said housing, and a heat conducting plate member conductively attached to said rod member outside said housing adjacent said ventilating area whereby said temperature-sensitive resistance is effectively maintained at the temperature of said plate member.

10. In combination, a housing having a ventilating area in at least one wall thereof, an electronic thermometer circuit including a temperature-sensitive device disposed within said housing, a heat conducting rod member extending between opposite sides of said one wall and having said temperature-sensitive device attached thereto within said housing, grommet means for insulating said rod member from said housing, and a heat conducting plate member conductively attached to said rod member outside said housing adjacent said ventilating area whereby said temperature-sensitive device is effectively maintained at the temperature of said plate member; said electronic thermometer circuit including meter means having at least two terminals and including a linear temperature scale and an indicating arm adapted to move across said scale to indicate temperatures in response to effective currents flowing through said meter means between said terminals thereof; an input transformer means having a secondary coil with at least two terminals, means coupling one of said terminals of said secondary coil with one terminal of said meter means, first and second diodes, each having a positive terminal and a negative terminal, means coupling the positive terminal of said first diode and the negative terminal of said second diode with the other terminal of said secondary coil, a first capacitance coupled between the negative terminal of said first diode and said one terminal of said meter means, a second capacitance coupled between the positive terminal of said second diode and said one terminal of said meter means, a voltage regulating means, said voltage regulating means comprising a voltage regulating tube means having two terminals, a first resistance means coupled between one terminal of said tube means and said negative terminal of said first diode, and a second resistance means coupled between the other terminal of said tube means and said positive terminal of said first diode; third resistance means coupled between said other terminal cf said tube means and the other terminal of said meter means; a series network comprising fourth and fifth resistance means coupled between said one terminal of said tube means and said one terminal of said meter means; a sixth resistance means coupled between the junction of said fourth and fifth resistance means and said other terminal of said meter means, at least one other temperature-sensitive device in addition to said temperature-sensitive device disposed within said housing, and switching means for selectively coupling either of said temperature-sensitive devices in parallel with said fifth resistance means.

11. In an electronic thermometer, the combination of a measuring means adapted to unidirectionally indicate a substantial range of temperatures in response to effective currents flowing therethrough, first circuit means operated at ambient temperatures for causing a first current to flow through said measuring means in one direction, second circuit means for causing a second current to flow through said measuring means in a direction opposite said one direction, said second circuit means including temperature sensitive means and resistance means for producing linear variations in the magnitude of said second current in response to substantial changes in temperature, whereby the effective current flowing through said measuring means is variable with the temperatures being determined, said first and second circuit means including a common transformer having a single secondary winding to which both circuit means are connected and through which both circuit means are powered.

12. An electronic thermometer as defined in claim 11 wherein said measuring means is linearly calibrated, wherein said temperature-sensitive means has a non-linear temperature characteristic, and wherein said second circuit means further includes means for linearizing said variations in the magnitude of said second current in response to changes in temperatures.

13. An electronic thermometer as defined in claim 11 wherein said temperature-sensitive means comprises a plurality of temperature-sensitive devices and wherein said combination further includes means for selectively coupling said temperature-sensitive devices within said second circuit means.

14. An electronic thermometer as defined in claim 11 wherein said temperature-sensitive means includes a plurality of non-linear temperature-sensitive devices, wherein said resistance means includes a single resistance means for linearizing any one of said temperature-sensitive devices, and wherein said second circuit means includes multi-position switching means for selectively coupling any one of said temperature-sensitive devices in parallel with said single resistance means.

References Cited by the Examiner

UNITED STATES PATENTS

| | | | |
|---|---|---|---|
| 2,072,312 | 3/37 | Obermaier | 73—342 |
| 2,109,169 | 2/38 | Field. | |
| 2,271,975 | 2/42 | Hall. | |
| 2,349,685 | 5/44 | Truckess | 321—18 |
| 2,435,961 | 2/48 | Gibbons et al. | 321—18 |
| 2,612,780 | 10/52 | De Brugne | 73—362 |
| 2,645,126 | 7/53 | Hornfeck | 73—355 |
| 2,741,126 | 4/56 | Anderson et al. | 73—362 |
| 2,938,385 | 5/60 | Mack et al. | 73—362 |
| 2,945,174 | 7/60 | Hetzler | 323—22 |
| 2,976,729 | 3/61 | Smith | 73—342 |
| 3,082,625 | 3/63 | Zimmerman | 73—362 |

ISAAC LISANN, *Primary Examiner.*